Figures 4, 5:
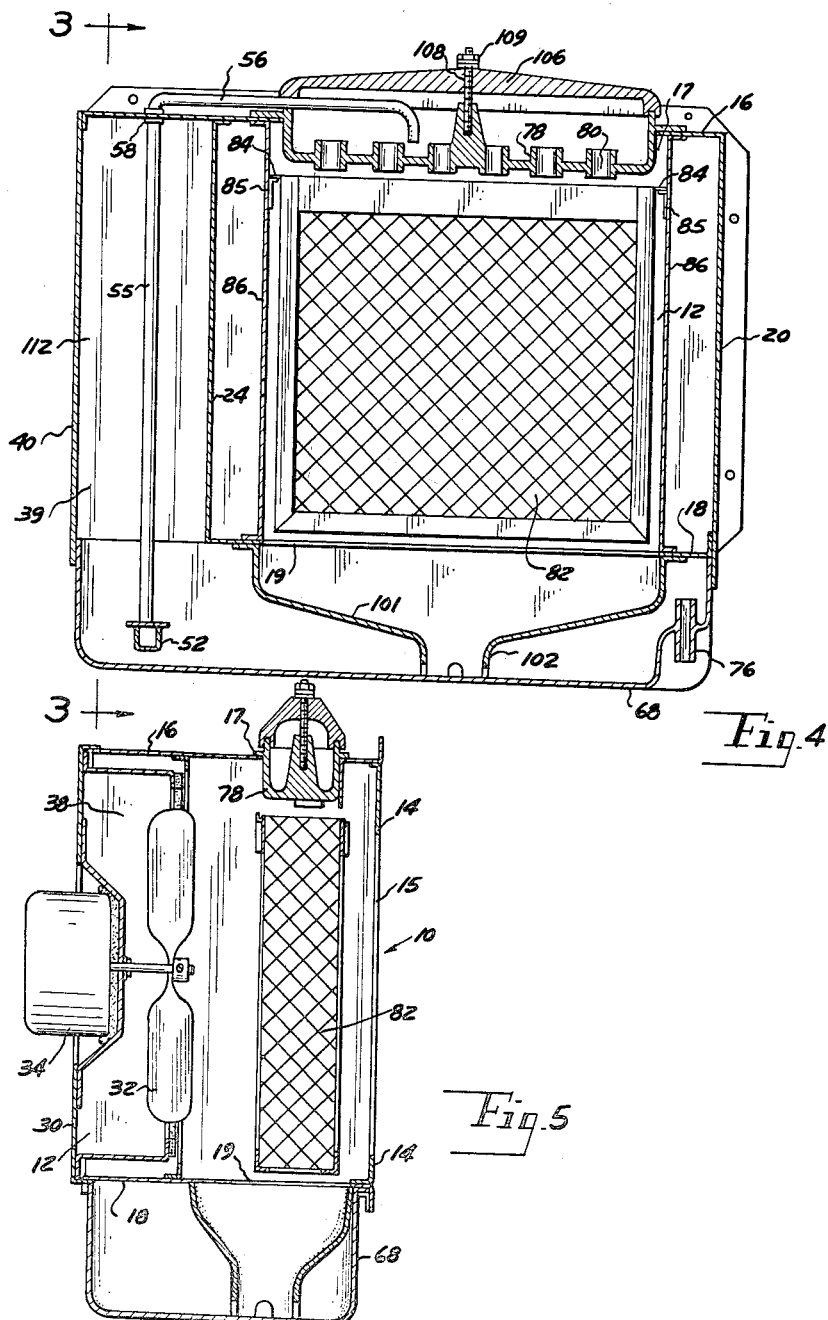

Nov. 3, 1964     J. PERLMAN     3,155,747
POWER HUMIDIFIERS
Filed Sept. 10, 1962     4 Sheets-Sheet 1
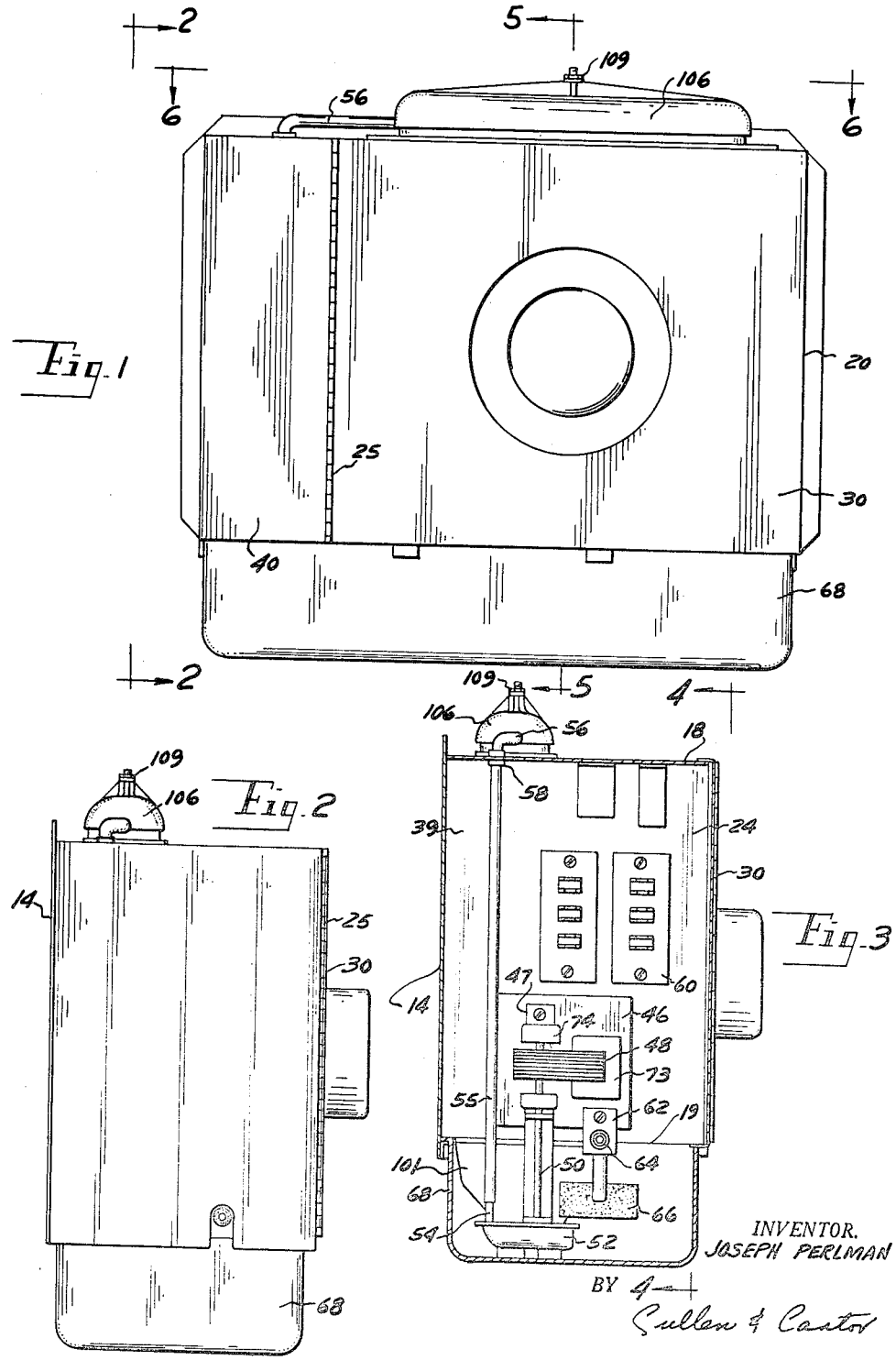
INVENTOR.
JOSEPH PERLMAN
BY
Cullen & Cantor
ATTORNEYS Nov. 3, 1964

J. PERLMAN 3,155,747

POWER HUMIDIFIERS

Filed Sept. 10, 1962

4 Sheets-Sheet 2

INVENTOR.
JOSEPH PERLMAN
BY
Cullen & Caxton
ATTORNEYS

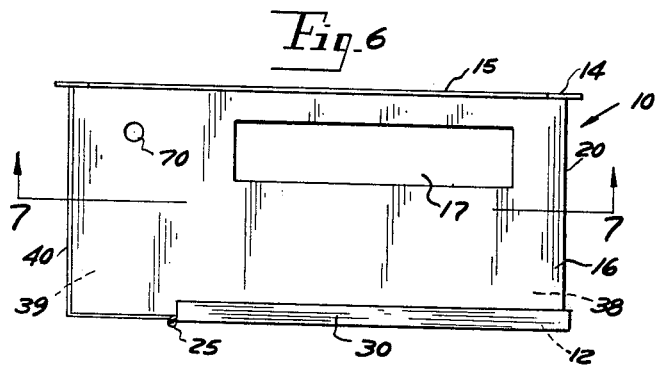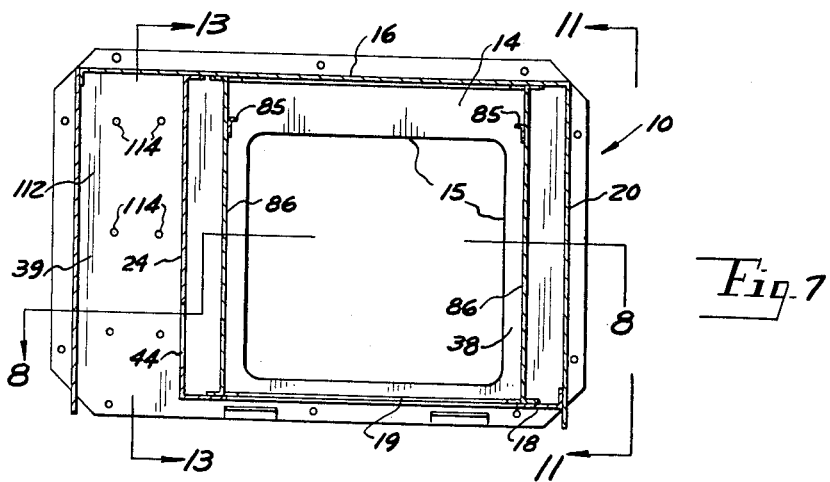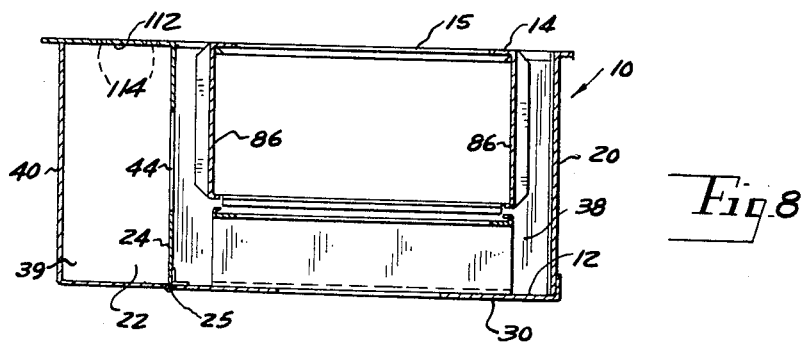

Nov. 3, 1964   J. PERLMAN   3,155,747
POWER HUMIDIFIERS
Filed Sept. 10, 1962   4 Sheets-Sheet 4
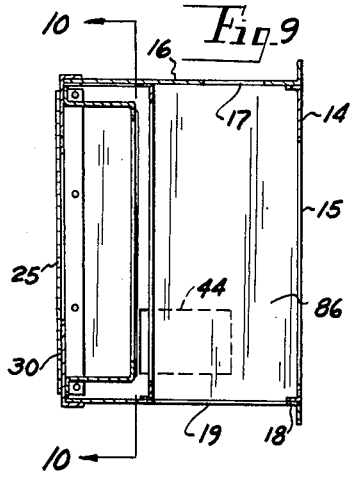
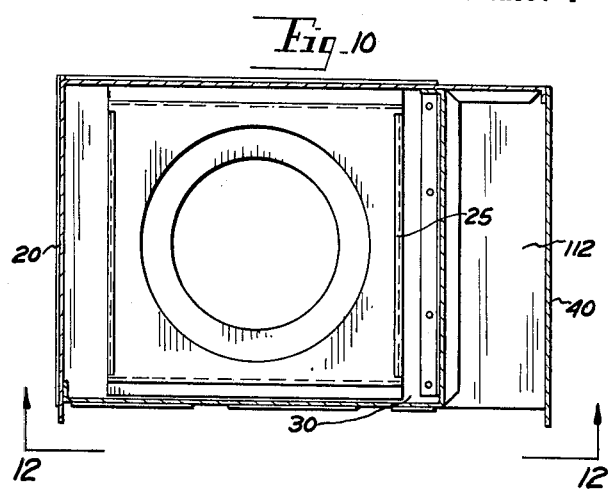
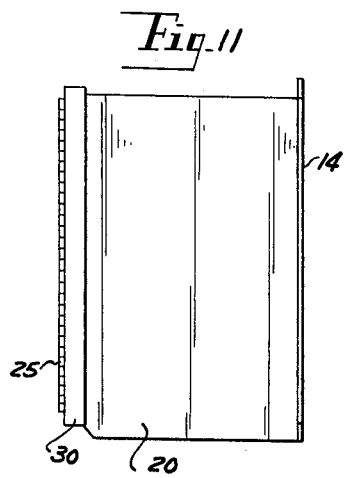
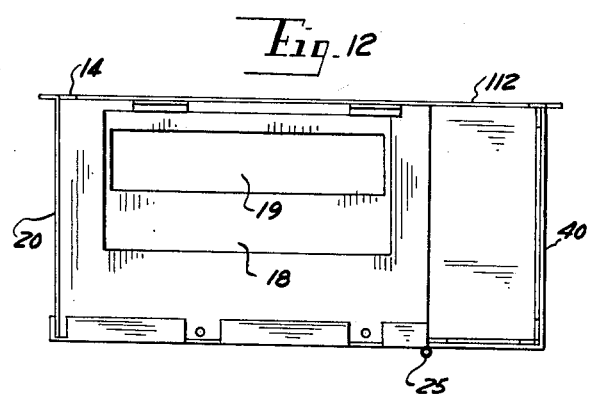
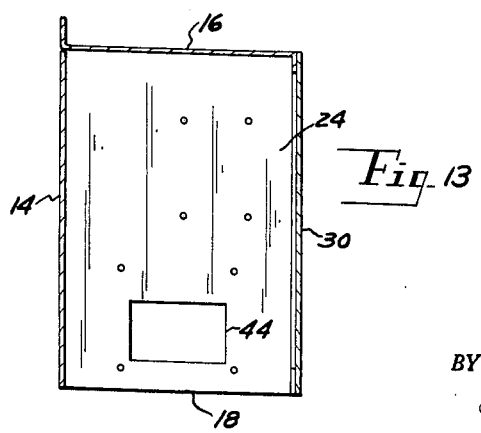
INVENTOR.
JOSEPH PERLMAN
BY
Cullen & Cantor
ATTORNEYS United States Patent Office 3,155,747
Patented Nov. 3, 1964

3,155,747
POWER HUMIDIFIERS
Joseph Perlman, Detroit, Mich., assignor to
Auto-Flo Corporation, Detroit, Mich.
Filed Sept. 10, 1962, Ser. No. 222,276
1 Claim. (Cl. 261—29)

This application relates to power humidifiers. A power humidifier is affixed to an air duct such as a furnace plenum at an opening thereof for humidifying the air moving through such duct or plenum. A power humidifier has a large sheet metal box or casing whose rear wall is open and fits over a large opening in the duct. Inside the box are the humidifier parts essentially these: a large size evaporator mesh pad over which water flows, a motor driven fan for blowing air through such pad to be humidified by the water flowing through the pad, a water pan below the pad, motor driven pump for lifting water as needed from the pan to a distributor above the pad to trickle water onto the pad, and a float control for water from an outside water line into the pan.

A particular object of the present invention is to provide a novel construction of power humidifier characterized by extreme simplicity of manufacture, installation and servicing.

Another object of the present invention is to provide a power humidifier divided into two compartments isolated by a mounting plate, with electrical operating parts mounted on one side of such mounting plate in one compartment, the mounting plate serving to isolate such electrical operating parts from the other compartment, on the opposite side of the mounting plate, containing the fan and evaporator pad, thus isolating the electrical compartment from the evaporator compartment.

A still further object is to provide a novel construction employing a mounting plate having numerous functions among which are to mount electrical operating parts, to barrier the electrical compartment from the evaporator compartment, to strengthen the humidifier by serving as a cross-brace between opposed parallel walls, and to assist other parts in providing a stable mounting for hingedly mounted parts such as the cover plate of a humidifier.

A still further object is to provide in a power humidifier a novel arrangement for mounting a pump motor, such arrangement comprising a large steel mounting plate having a large hole therein covered by an aluminum pad secured to the mounting plate and upon which the pump motor is directly mounted, such aluminum pad serving to reduce noises from the pump motor caused, it is believed, by the presence of magnetic disturbances due to the magnetic relationship between the pump motor and the steel mounting plate.

Still further objects of the invention will best be understood upon reference to the following detailed description of one preferred embodiment of the power humidifier of the invention, shown in the appended drawings:

In these drawings:

FIG. 1 is a front elevation view of the humidifier.
FIG. 2 is a left end view on line 2—2, FIG. 1.
FIG. 3 is a left section view as if on line 3—3, FIG. 4.
FIG. 4 is a front section view as if on line 4—4, FIG. 5.
FIG. 5 is a right section view as if on line 5—5, FIG. 1.
FIG. 6 is a top plan view, as if on line 6—6, FIG. 1, of a chassis part only.
FIG. 7 is a front section view, as if on line 7—7, FIG. 6.
FIG. 8 is a plan section view, as if on line 8—8, FIG. 7.
FIG. 9 is a right section view.
FIG. 10 is a rear section view, as if on line 10—10, FIG. 9.
FIG. 11 is a right end view.
FIG. 12 is a bottom plan view, as if on line 12—12, FIG. 10.
FIG. 13 is a left section view, as if on line 13—13, FIG. 7.

*Chassis.*—Referring to the drawings, it will be observed that the power humidifier hereof comprises a chassis 10 (FIG. 6) in the form of a sheet metal box having an open front 12 (FIG. 8), a back 14 (FIG. 7) having a large opening 15, a top 16 (FIG. 6) having an opening 17, a bottom 18 (FIG. 9) having an opening 19, a closed right side wall 20 (FIG. 8), an open left side 22 and a steel mounting plate 24 to the right of the open left side and extending from top to bottom and from front to back of the chassis. The foregoing parts form a chassis or box on which the remaining parts of the humidifiers are mounted as will now be described.

*Front Cover Plate.*—The forward edge of the mounting plate 24 carries a hinge 25 (FIG. 6) to which is secured front cover plate 30 which is thus hingedly mounted over the open front 12 and extends from the mounting plate to the right side wall 20 and carries a fan 32 (FIG. 5) and a fan motor 34. Fan 32 is thus located in a fan compartment 38 to the right of the mounting plate 24, such compartment being closed by top 16, bottom 18, right side 20, mounting plate 24, and cover 30, and open at back opening 15.

*Water and Electrical Parts.*—The compartment 39 (FIG. 8) to the left of the mounting plate is covered by a side plate 40 of L-cross-section movably mounted on the front and left sides and covering the left side and the compartment 39 to the left of the mounting plate 24 and thus completing the enclosure of such compartment. In compartment 39 are the water and electrical parts now to be described. Mounting plate 24 has a hole 44 over which is secured, by screws, an aluminum pad or plate 46 (FIG. 3) carrying a bracket 47 upon which is mounted a solenoid motor 48 whose shaft 50 has at its lower end a pump 52. Outlet 54 of such pump is connected to a water pipe 55–56 extending up through an opening 58 in top 16 and lying over such top. On mounting plate 24 is mounted a wiring block 60.

Aluminum pad 46 mounts a bracket 62 which in turn mounts a valve and inlet nipple structure 64, and a float 66 for responding to the level of water in a pan 68. Top 16 has a hole 70 (FIG. 6) through which an outside water line enters and is connected to nipple 64 for admitting water into pan 68 as demanded by float 66 which controls the valve in nipple and valve structure 64.

The solenoid 73 of motor 48 is equipped with a valve 74 which shuts off the water supply when the humidifier electrical system is deenergized. This is effected by the furnace switch which not only controls furnace and furnace blower operation but also the electrical supply to terminals on block 60 to which are connected the pump solenoid 73 and also the fan motor 34.

Water pan 68 is removably mounted under and against bottom 18 of chassis box 10 to cover opening 19, and has an overflow opening 76 (FIG. 4). Removal of pan 68 permits cleaning it of deposits from the water in such pan.

The outlet end of water pipe 56, lying over top 16, overlies opening 17 (FIG. 4) in which is fitted and secured a water distributor 78 whose holes 80 permit water in distributor 78 to flow gently down onto the upper edge of a large area mesh evaporator pad 82 disposed vertically on edge in fan compartment 38, behind fan 32, forward of back opening 15, under top opening 17 and above bottom opening 19, and held in place by fingers 84 overlying brackets 85 on vertical members 86 in compartment 38.

Evaporator pad 82 is easily replaceable when front cover 30 is swung open on hinge 25. Cover 30 is normally held closed.

Valve structure 64 hereof is identical with that shown at 17–59 of a patent to Perlman No. 2,897,815 of 1959.

*Air Trap.*—Air pumped into fan compartment 38 by fan 32 could and often does escape downwardly through bottom opening 19, into water pan 68, and then into control compartment 39 through its open bottom, near pump 57 and float 66. To prevent this an air trap means 101 (FIG. 4) of funnel shape is placed in pan 68 under evaporator pad 82, with its upper end open to the bottom opening 19 and its lower open end 102 in pan 68, to be filled with water to a level sufficient to close such lower end 102.

*Trough Cover.*—Air pumped into fan compartment 38 by fan 32 could and often does undesirably escape upwardly through water distributor trough 78 and its trickle holes 80. To prevent this an air escape cover 106 (FIG. 4) of domed form is laid over trough 78, with its lower edge sealing to such trough. A hold down screw 108, fixed to trough 78, and a nut 109 thereon, hold cover 106 in place. Cover 106 is notched for clearance for water inlet pipe 56.

*Mounting.*—Back wall 14 has a portion 112 which extends to the left (FIG. 8) several inches beyond mounting plate 24, to the left side of side plate 40 and has two parallel vertical rows of mounting holes 114 (FIG. 7) either of which, as desired may be used in mounting the humidifier, depending upon the width of the plenum opening against which it is mounted. The left side portion 112 of back wall 14 provides a back cover or closure for the control compartment 38, in any and all mounting situations, whether the plenum opening be wide or narrow.

*Operation.*—Hot dry air in the furnace plenum and thus in box 10 is moved by fan 32 through the evaporator pad 82 and, thus humidified, is propelled into the furnace duct system and distributed through the home supplied from such duct system by the furnace blower. Operation of the latter also controls operation of the fan 32 and the water pump 52. The unit here shown maintains the water supply for pad 82 by means of float 66, valve structure 64, solenoid valve 74, and recirculating pump 52. No drain connection is required.

Where the water is very hard or domestically softened, a drain connection (not shown) may be included and excess water is drained off, rather than recirculated.

Where desired, a humidistat (not shown) may also be included.

*Summary.*—The humidifier here shown is divided into two compartments 38, 39, isolated by mounting plate 24, the latter mounting electrical parts 48, 60, and the wiring in compartment 38, with compartment 39 containing evaporator pad 82 and fan 32.

Mounting plate 24 mounts the electrical and wiring parts, barriers compartments 38–39 relatively, strengthens the box 10 by connecting its parallel top and bottom walls 16–18, and with stability mounts cover 30, fan 32 and motor 34.

Aluminum pad 46 destroys the magnetic relation between pump solenoid 73, motor 48, and the steel mounting plate 24.

*Conclusion.*—Now having described the humidifier herein shown, reference is had to the claim which follows.

I claim:

In a power humidifier, a sheet metal box having a front, back, top and bottom, with openings formed in each, and sides, all connected together into a box-shape; a front cover plate movably mounted on the box front and closing the opening therein and carrying a fan and a motor; a water pan formed as a separate and independent pan completely outside of the box and removably mounted under and against and secured to the bottom of the box and closing the opening therein; an open top water distributor formed as a separate and independent trough and inserted as a unit into the box top opening to occupy and fill said top opening and having a marginal flange resting upon the box top at such top opening to support said trough on the top of the box; a cover over said trough and secured to and carried by it separately and independently of the box; an evaporator pad mounting means removably mounting an evaporator pad in the box under the distributor and said pad being of an area only slightly less than that of the front opening of the box and thus being insertable into the box through said front opening for mounting therein when the front cover plate is moved to expose the box front opening; and circulating means for carrying water from said water pan to said distributor, said humidifier also including an air trap means in said pan comprising a funnel under the bottom opening of the box and underlying the lower edge of said evaporator pad with its large end opening upwardly to the interior of the box and its small end opening downwardly into the water pan, with its lower edge engaging said pan, and having lateral openings at its small end.

References Cited in the file of this patent

UNITED STATES PATENTS

| | | |
|---|---|---|
| 1,872,195 | Thompson | Aug. 16, 1932 |
| 1,988,262 | Burckhalter et al. | Jan. 15, 1935 |
| 2,185,562 | Neilsen | Jan. 2, 1940 |
| 2,201,647 | Feinberg | May 21, 1940 |
| 2,594,688 | Shapiro | Apr. 29, 1952 |
| 2,710,717 | Palmer | June 14, 1955 |
| 2,725,729 | Mills | Dec. 6, 1955 |
| 2,835,476 | Kohut | May 20, 1958 |
| 2,875,435 | McMillan | Feb. 24, 1959 |
| 2,984,464 | Herr | May 16, 1961 |
| 3,063,766 | Goettl | Nov. 13, 1962 |
| 3,092,096 | Nett et al. | June 4, 1963 |
| 3,105,749 | Gebert et al. | Oct. 1, 1963 |

FOREIGN PATENTS

| | | |
|---|---|---|
| 635,136 | Canada | Jan. 23, 1962 |
| 637,465 | Canada | Feb. 27, 1962 |